United States Patent
Stofberg et al.

(10) Patent No.: US 9,298,941 B2
(45) Date of Patent: Mar. 29, 2016

(54) SECURE DATA COPYING

(71) Applicant: EPI-USE SYSTEMS, LTD, Douglas (IM)

(72) Inventors: Phillip Stofberg, Roswell, GA (US); Marius Smit, Tucker, GA (US); Izak Petrus De Villiers, Roswell, GA (US)

(73) Assignee: EPI-USE SYSTEMS, LTD., Douglas (IM)

( * ) Notice: Subject to any disclaimer, the term of this patent is extended or adjusted under 35 U.S.C. 154(b) by 0 days.

(21) Appl. No.: 14/075,934

(22) Filed: Nov. 8, 2013

(65) Prior Publication Data
US 2014/0137262 A1 May 15, 2014

Related U.S. Application Data

(60) Provisional application No. 61/725,330, filed on Nov. 12, 2012.

(51) Int. Cl.
*G06F 21/00* (2013.01)
*G06F 21/62* (2013.01)
(Continued)

(52) U.S. Cl.
CPC ........ *G06F 21/6218* (2013.01); *G06F 11/1446* (2013.01); *G06F 11/1451* (2013.01);
(Continued)

(58) Field of Classification Search
CPC . G06F 17/30; G06F 11/14; G06F 2221/0782; G06F 21/62; H04L 9/06; H04L 63/04
USPC ................... 726/1, 31–33, 26; 713/164–167; 707/640–673
See application file for complete search history.

(56) References Cited

U.S. PATENT DOCUMENTS 7,974,942 B2  7/2011  Pomroy et al.
8,055,668 B2  11/2011  Pomroy et al.
(Continued)

FOREIGN PATENT DOCUMENTS

CA    2620982       8/2009
EP    1637955 A1    3/2006
WO    2008092813 A1 8/2008

OTHER PUBLICATIONS

Narayanan, Arvind, and Vitaly Shmatikov. "Obfuscated databases and group privacy." Proceedings of the 12th ACM conference on Computer and communications security. ACM, 2005.*

(Continued)

*Primary Examiner* — Madhuri Herzog
(74) *Attorney, Agent, or Firm* — Taylor English Duma LLP

(57) ABSTRACT

A method, computer program product, and system for the anonymization of sensitive data from a plurality of selected business objects or tables stored in a plurality of data fields in at least one primary database included in an enterprise database system when copying portions of the at least one primary database to a secondary database or updating an existing database with anonymized values for the sensitive fields therein. A plurality of data fields is specified for copying from the at least one primary database. At least one integrity map is generated and populated for each data field in the primary database requiring anonymization before copying to the secondary database. The at least one integrity map is stored in a table associated with the primary database. An anonymized value is generated for each data field in the primary database requiring anonymization. Each data field in the primary database requiring anonymization is substituted with the anonymized value. The portions of the at least one primary database including anonymized values are copied to a secondary database.

7 Claims, 11 Drawing Sheets

(51) Int. Cl.
  *H04L 29/06* (2006.01)
  *G06F 11/14* (2006.01)
  *H04L 9/06* (2006.01)

(52) U.S. Cl.
  CPC ............ *G06F11/1453* (2013.01); *G06F 21/62* (2013.01); *G06F 21/6254* (2013.01); *H04L 63/0428* (2013.01); *G06F 11/1458* (2013.01); *H04L 9/0643* (2013.01)

(56) References Cited

U.S. PATENT DOCUMENTS

| | | | | |
|---|---|---|---|---|
| 8,694,646 | B1* | 4/2014 | Kothari et al. | 709/227 |
| 2005/0251865 | A1* | 11/2005 | Mont | G06F 21/6245 726/26 |
| 2008/0270370 | A1* | 10/2008 | Castellanos et al. | 707/4 |
| 2009/0024589 | A1 | 1/2009 | Sood et al. | |
| 2010/0030795 | A1 | 2/2010 | Pattabhi et al. | |
| 2010/0192220 | A1 | 7/2010 | Heizmann et al. | |
| 2010/0306854 | A1 | 12/2010 | Neergaard | |
| 2012/0072992 | A1* | 3/2012 | Arasaratnam | G06F 21/602 726/26 |
| 2012/0131058 | A1 | 5/2012 | Farber et al. | |
| 2012/0131075 | A1* | 5/2012 | Mawdsley et al. | 707/825 |
| 2013/0054650 | A1* | 2/2013 | O'Byrne | 707/793 |
| 2013/0282679 | A1* | 10/2013 | Khin et al. | 707/698 |

OTHER PUBLICATIONS

International Search Report and Written Opinion of the International Searching Authority dated Feb. 27, 2014 for PCT/US2013/069318 filed Nov. 8, 2013.

Stofberg, Phillip; PCT Application entitled: Secure Data Copying, having serial No. PCT/US2013/069318, filed Nov. 8, 2013, 52 pgs.

Stofberg, Phillip; U.S Provisional Application entitled: Secure Data Copying, U.S. Appl. No. 61/725,330, filed Nov. 12, 2012; 43 pgs.

Stofberg, Phillip; International Search Report and Written Opinion for serial No. PCT/IB2013/003154, filed Nov. 8, 2013, mailed Jun. 27, 2014, 56 pgs.

Stofberg, Phillip; International Preliminary Report on Patentability for serial No. PCT/IB2013/003154, filed Nov. 8, 2013, mailed May 21, 2015, 10 pgs.

* cited by examiner

400

Anonymization Table

| Table | Field | Integrity map(s) |
|---|---|---|
| Tpayroll | Emp_name | IM_300, IM_303 |
| Trecord | Ee_tax_name | IM_302 |
| | | ⋮ |

Tpayroll

| Social Sec # | Emp_name | Address |
|---|---|---|
| 456-23-4367 | Peter | 20 Creekwood Dr |
| 813-34-8732 | John | 423 Sparrow Ave |
| 724-47-0993 | Paul | 63 Tager Dr |

SECURE DATA COPYING

CROSS-REFERENCE TO RELATED APPLICATION

This application claims the benefit of U.S. Provisional Patent Application Ser. No. 61/725,330 filed on Nov. 12, 2012. The specification and drawings of the provisional patent application are specifically incorporated by reference herein.

TECHNICAL FIELD

Embodiments of the invention generally relate to data privacy and security and, more particularly, to protecting the confidentiality of sensitive data stored in a large database in a business enterprise computer system when portions of the stored data are required for use in non-production development and testing systems.

BACKGROUND OF THE INVENTION

Legal, governance, and privacy requirements are putting an increased obligation on entities storing public and other sensitive data to maintain very high standards of data security. The centralized (i.e., integrated), distributed or networked use of data increases the complexity of maintaining such standards.

One particular challenge arises when copies, or partial copies, have to be made of enterprise system databases for (1) development and testing of new applications, (2) training, (3) load testing, or (4) data mining or analysis, without divulging confidential personal, customer or other information, or where access to such information is restricted by law.

This matter is complicated by several factors but is not limited to the following scenarios or combinations of them. In one scenario, copies often need to be made of subsets of records spread over multiple tables, where the tables are related on the basis of business processes and work flow, rather than on structure only, i.e., on foreign key relationships between fields. In another scenario, copies of different subsets of data are made from multiple source systems to multiple target systems. In a third scenario, copies are made to existing databases where data is updated incrementally, and new anonymized values need to be consistent with pre-existing ones. In a fourth scenario, where a full copy of an existing system has been made, the data in the new copied system may need to be anonymized to be made secure.

SUMMARY

In an exemplary embodiment, only selected records and fields of a database table in a computer data storage device are anonymized, and each field to be anonymized is protected by its own transformation function which ensures independence between fields and uniqueness of anonymized values where required.

In one embodiment, a method is provided for anonymization of data from selected business objects including: reading a first list of tables and the specific records in them which are to be copied; reading a second list of tables and the specific fields in them which need to be anonymized; copying the specified records in the first list; and, if any of their fields are in the second list, anonymizing them. The method is adaptable for very high volume databases, where subsets are selected based on related business objects spread over many tables pertaining to specific time periods. In this description, anonymization refers to the substitution of original data values by other realistic values of the same kind, but in such a way that the new values cannot be traced back to the original ones.

In exemplary embodiments, a technique is implemented that: (1) selects only those fields to be anonymized in the records to be copied; (2) calculates an anonymized value, based on input values from the selected records plus additional values, if required, to ensure a unique anonymized value; (3) stores the calculated anonymized values in a re-usable and sharable value table; and (4) reads the value table during data copying to obtain anonymized values.

In one embodiment, a method is provided for the anonymization of sensitive data from a plurality of selected business objects or tables, stored in a plurality of data fields in at least one enterprise system database, the primary database, included in an enterprise system when copying portions of the at least one primary database from a computer data storage device to a non-production database, also referred to herein as a secondary database, a secondary database system, or a secondary system. A plurality of tables is specified for copying from the at least one primary database by a computer processor coupled to the primary database stored on the data storage device. At least one database table called an integrity map is generated and populated for each data field in the primary database requiring anonymization before copying to the secondary database by the computer processor. The at least one integrity map is stored in a table associated with the primary database. An anonymized value is computed for each data field value in the primary database requiring anonymization by the computer processor. The portions of the at least one primary database including anonymized values that are substituted for original values are copied to a secondary database by the computer processor.

In one embodiment, a full copy of a primary database may be made. The data anonymization process is then applied to the database of the live copied non-production system, which is the primary database in such an embodiment, by selecting the fields that need to be anonymized, calculating corresponding anonymized values for the original values of the fields to be anonymized, and replacing the original values in the database by the anonymized values in all the positions in which the original values were stored.

BRIEF DESCRIPTION OF THE DRAWINGS

These and other advantages and aspects of the embodiments of the disclosure will become apparent and more readily appreciated from the following detailed description of the embodiments taken in conjunction with the accompanying drawings, as follows.

FIGS. 4A-4B illustrates an anonymization table in an exemplary embodiment.

DETAILED DESCRIPTION

The following detailed description is provided as an enabling teaching of embodiments of the invention including the best, currently known embodiment. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the invention and not in limitation thereof, since the scope of the invention is defined by the claims.

The scenarios identified in the background section differ from the anonymization commonly performed, in the sense that, in the background scenarios, only a subset of records may be selected (e.g., pertaining to a given year), the semantics of a field value, such as the gender of a person, may need to be preserved, or one field value occurring in various tables across different landscapes of systems, may need to be substituted by the same anonymized value. In addition, values can be anonymized before they leave a database system when copied out of that database system—which enhances security—and anonymization of a value is done once only, and then repeated through lookup to a value in a persistent table.

Although the scenarios and contexts mentioned above demonstrate the environments where the disclosed embodiments are useful, the disclosed embodiments are not restricted to such environments. The above applications are mentioned by way of example to demonstrate the use of the disclosed embodiments. The disclosed embodiments may be applicable to computer software systems of all sizes, and in many other contexts, as will be clear to someone skilled in the art of using such systems. The disclosed embodiments may be used with multiple interconnected primary systems. In this disclosure, the singular form may be used when referring to one system only; however, the techniques disclosed apply equally to the copying of multiple interconnected co-evolving primary systems. The term field is used to refer to both (1) one field value in a specific record in a table, and (2) the collective set of the values of the field in all the records in a table, and (3) the field name, depending on the context. In some instances the exact order in which records and fields are processed, in the method described, may be changed without affecting the essence of the method.

Figure 1A:
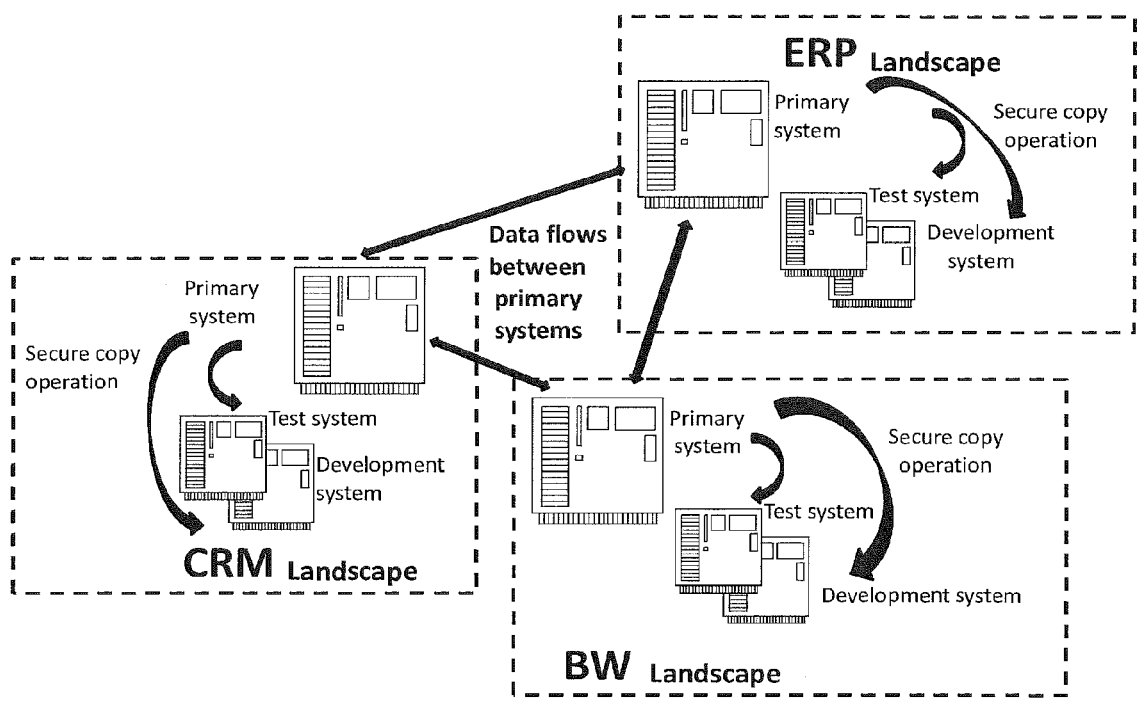
FIG. 1A illustrates a multiple interconnected primary database systems in which the disclosed embodiments can be utilized.

In exemplary embodiments for distributed system landscapes comprising multiple systems, such as an enterprise resource planning (ERP) system, a customer relationship management (CRM) system, and a business warehouse (BW) as illustrated in FIG. 1A, each of the system databases may need to be copied or partially copied in tangent. In particular, the disclosed embodiments ensure that values of a field that occurs in multiple tables or systems are anonymized consistently, i.e., data items that are stored redundantly for structural or business process reasons are anonymized to the same values for all occurrences. Data is anonymized in computer memory before it is copied in order to safeguard it against unauthorized access.

Figure 1B:
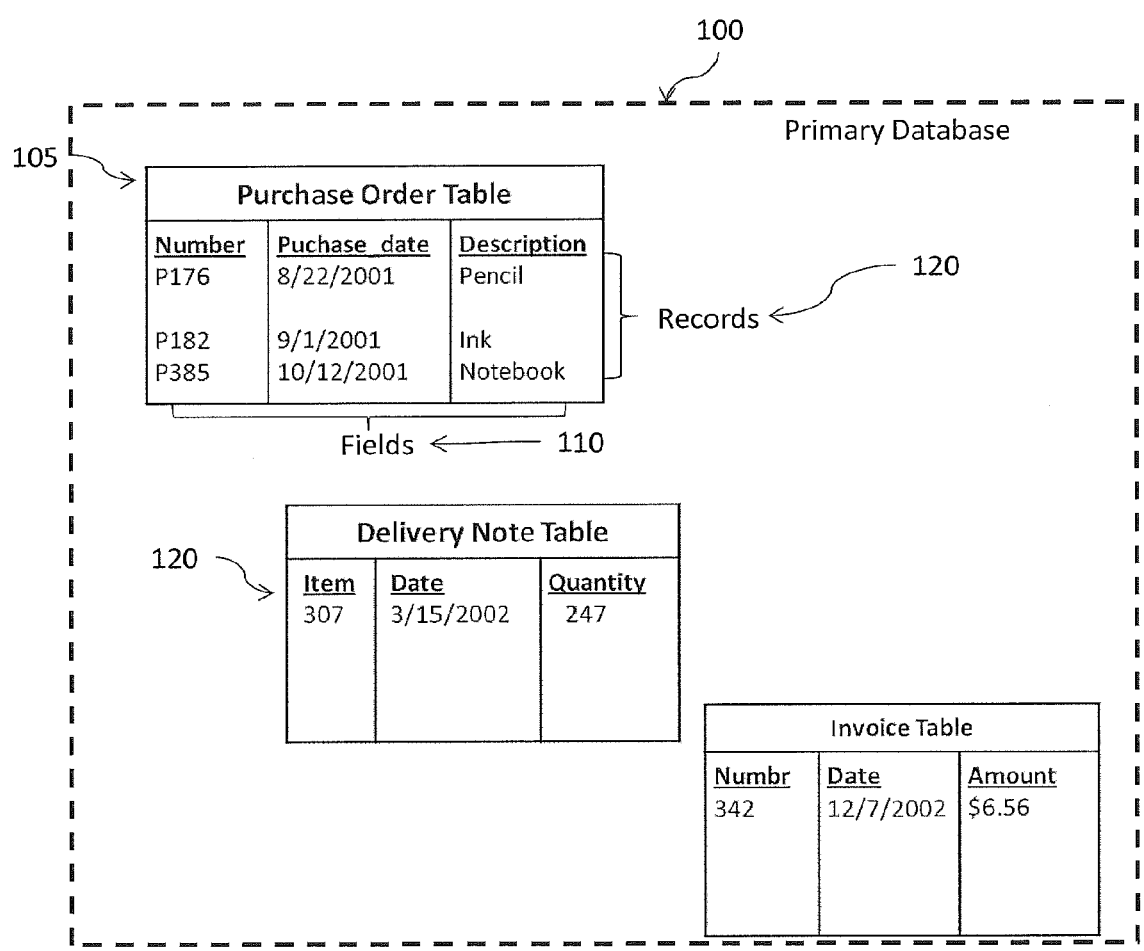
FIG. 1B illustrates the relationship between multiple tables, fields and records in a primary database.
Figure 1C:
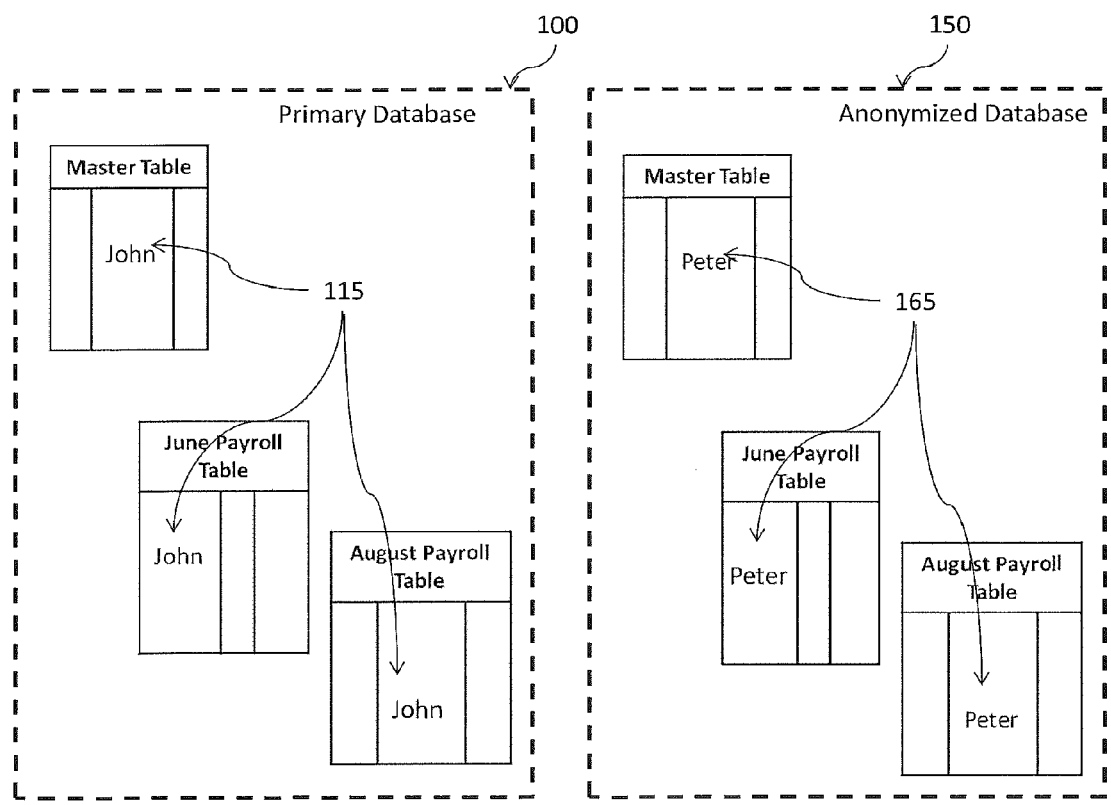
FIG. 1C illustrates the transformation that occurs when creating an anonymized database (target system) from a primary database (primary system) in an exemplary embodiment.

As illustrated in FIG. 1C, in one embodiment, a data value 115 in a primary system database 100, referred to as old_value, is anonymized, and the corresponding anonymized substitute data value 165, called new_value, is written to a secondary system 150, referred to as the target system.

Figure 1D:
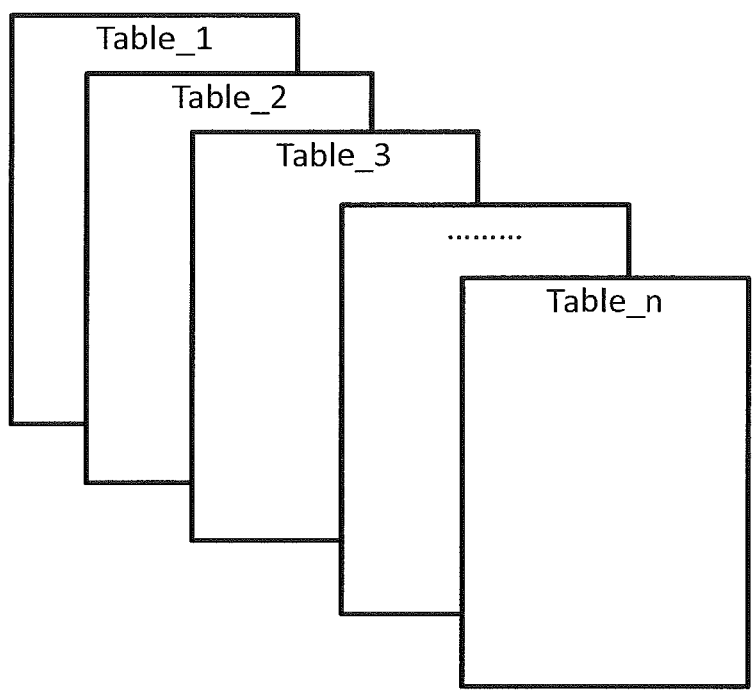
FIG. 1D illustrates that anonymization of complete database tables can occur during a copy operation in an exemplary embodiment.
Figure 1E:
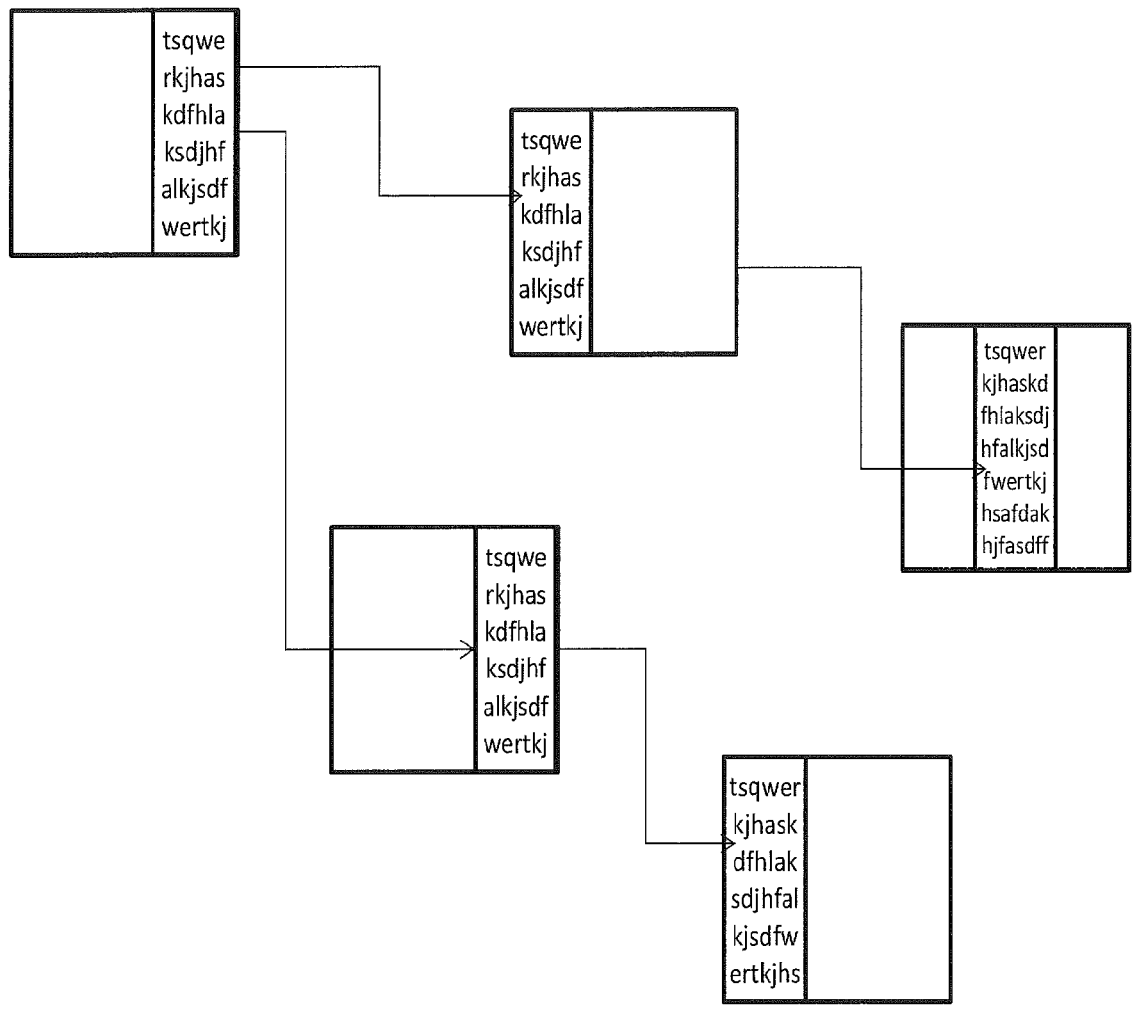
FIG. 1E illustrates the selection of data records from various tables in the database on the basis of specific business objects related to a business process in an exemplary embodiment.

The disclosed embodiments are capable of anonymizing values of specified fields during a copy operation, where the copy operation may comprise copying of one or more complete tables, as shown in FIG. 1D, or a subset of records surgically selected from various tables on the basis of specific business objects that are related on the basis of a business process, as shown in FIG. 1E. For example, payroll and tax information of a specific subset of employees between a given begin date and end date may need to be copied and anonymized where applicable. The sum total of tables and relevant records which need to be copied is called the copy set.

In one embodiment, the table relationships that determine whether a set of records are related may be stored in a metadata repository containing the business object definitions and relevant relationships. In another embodiment, the table relationships may be identified using data mining techniques.

Figure 2:
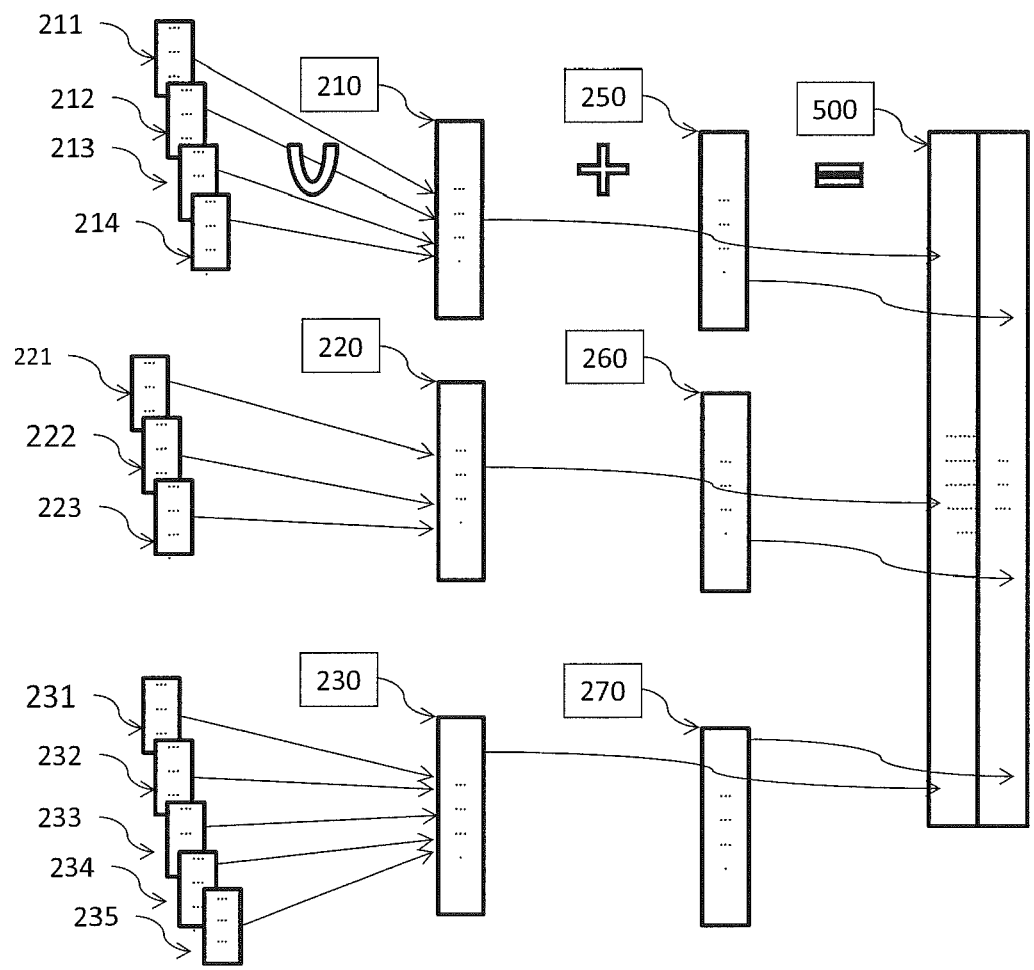
FIG. 2 illustrates an overview of the anonymization of a plurality of database fields in an exemplary embodiment.

As illustrated in FIG. 2, the disclosed embodiments address the following scenario: given that sets of database table-fields 211-214, 221-223, 231-235 need to be anonymized; the database table-fields may be part of different database tables, and the database table-fields may have different names, but may contain different or similar subsets of the same data.

The disclosed embodiments map each such set of database table-fields 211-214, 221-223, 231-235 onto one set ("main set"), 210, 220, 230 which contains the union of the records of the respective set of fields. In other words, main sets 210, 220, 230 are supersets of the sets of database table-fields 211-214, 221-223, 231-235, respectively, and may be stored in a table. Such tables 210, 220, and 230 may be called main tables. Each main set 210, 220, 230 is assigned its own transformation function which may have a set of parameters, and which is applied to produce its own new_value set 250, 260, 270, respectively. Each new_value set 250, 260, 270 contains a random set of anonymized values similar to the ones in the original database table-fields 211-214, 221-223, 231-235. The transformation function may associate each element (the encrypted old_value) in each main set 210, 220, 230 with a unique random element in the new_value set 250, 260, 270, wherein the randomization of the association may be driven by the parameters. The {encrypted old_value, new_value} pairs may be stored in a table 500, which will be referred to herein as the value table. Since each main set 210, 220, 230 constitutes the union of relevant database table-fields, each data element occurs once only, and a new_value is computed once only.

In exemplary embodiments, a computer software program can implement the anonymization process through the use of integrity maps, anonymization tables, and value tables as described in the following paragraphs.

Integrity Maps

Figure 3:
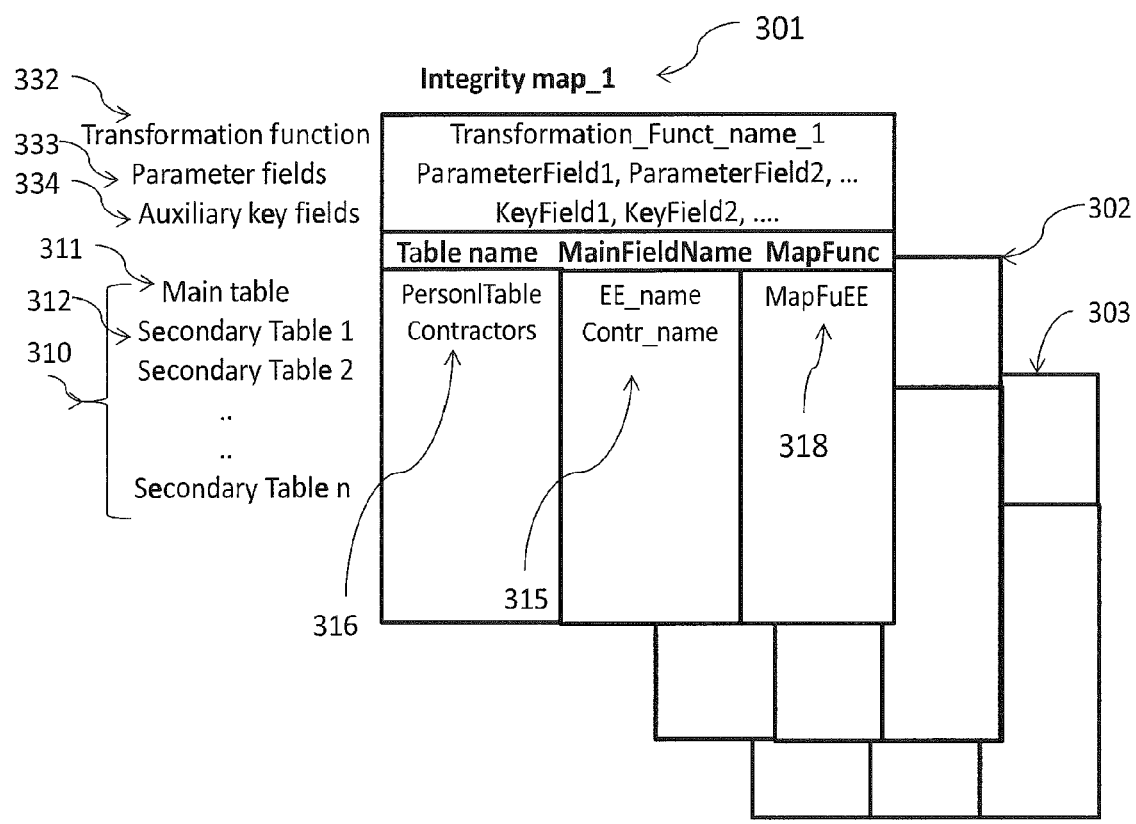
FIG. 3 illustrates integrity mapping in an exemplary embodiment.

Data fields are often duplicated in relational databases. This may happen due to structural or efficiency reasons. With reference to FIG. 1B, FIG. 1C, and FIG. 3, since the same field 110 can occur many times in a primary system 100, as well as in one or more other systems, integrity map tables 301, 302, 303 are constructed with the intention of preserving the integrity of the anonymized database 150 by ensuring that a data value 115 from a given field 110 is transformed to the same anonymized value 165 wherever it is encountered in the primary database 100. An integrity map 301 comprises a list of {table, field} pairs 310, which contain similar data, even though they have different names. Integrity maps are named as such because they ensure the preservation, during the anonymization process, of the integrity of groups of table fields that contain the same values, either due to database redundancy or for semantic purposes. In the example of an employee's name illustrated in FIG. 1C, the name 115 is stored in the Employee's main master information table, but is duplicated each time a payroll result is produced. The integrity map 301 documents all of these storage positions so that each can be anonymized to the same anonymized value. An integrity map 301 is configured once and stored in the primary system database 100. Each field 110 in the primary system database 100 which needs to be anonymized is assigned to an integrity map. However, due to its role in business processes, a specific field 110 may be anonymized in one context and not in another. Therefore, in one embodiment, a condition may be set for each field, determining when it should be anonymized.

With reference to FIG. 3, one of the tables listed in the integrity map is designated as the main table 311, and the remaining plurality of tables, if any, are then considered as secondary tables 312. The main table 311 is selected such that it contains all the records contained in secondary tables 312. In one exemplary application, if a field value is encountered during copying which does not appear in the main table, an anonymized value is calculated for it and stored in the value table 500.

In one embodiment, when a copy set has to be copied, the {table, field} pairs 410 in the copy set are matched against each integrity map 301, 302, 303 and an anonymization table may be constructed which is stored as an in-memory table for fast access. An anonymization table in one embodiment is illustrated in FIG. 4A. The anonymization table 400 may store each of the table and field combinations 410 of fields to be anonymized against the name of the integrity map 411 which should be used for its anonymization. If one field is listed in multiple integrity maps, the matching integrity maps are prioritized according to user preference. The field is matched to the identifiers (i.e., names) 413 of the integrity maps in priority order.

FIG. 4B illustrates the contents of one table, Tpayroll, which is listed in the anonymization table and which identifies the association among tables, fields, and prioritized integrity maps. The table Tpayroll identifies employee information such as name, address, and social security number.

In an embodiment, integrity maps may be implemented as one database table wherein distinction may be made between integrity maps by assigning a unique identifier to each integrity map.

Value Table

Figure 5:
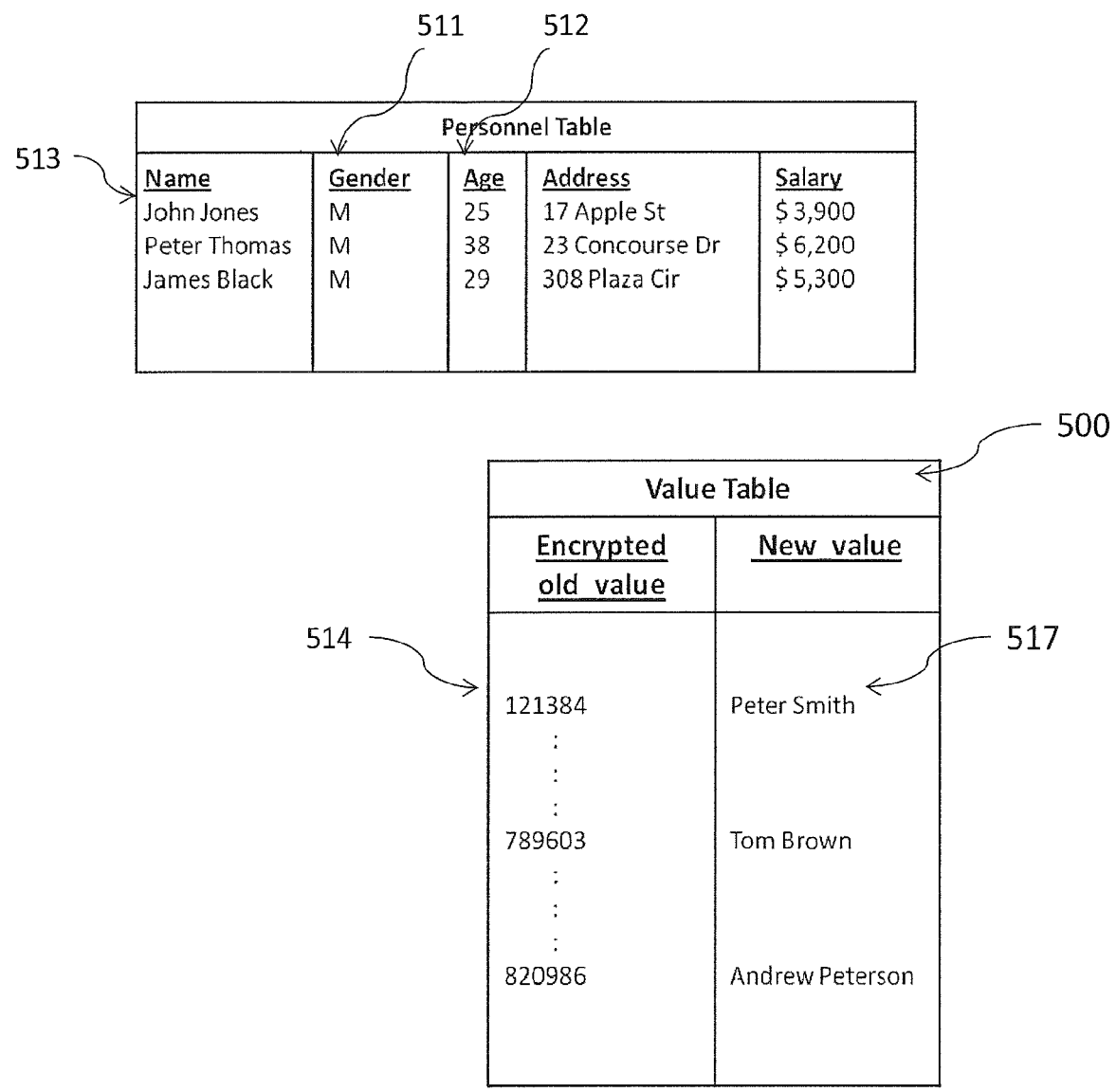
FIG. 5 illustrates a value table in an exemplary embodiment.

A value table 500 is created in the primary system 100 with the intention to store the designated anonymized value (new_value) for each old_value. FIG. 5 illustrates an exemplary value table. This has to be done for each field 110 of each record 120 of each table 105 in the primary system 100 which has to be anonymized. A function, called the transformation function 332, is applied to the old_value to produce a new_value that will replace the old_value in the anonymized database. The transformation function 332 is composed in such a way that it does not allow derivation of the old_value from the new_value, nor allow derivation of dependencies between fields. A transformation function 332 is selected for each {table, field} combination from a menu of (certified) functions by the authorized user and is stored in the relevant integrity map 301. In one embodiment, a one-way hash function is applied to the old_value to produce an encrypted key, the encrypted old_value. The encrypted old_value and new_value are written in the value table 500. The hash function encrypts the old_value into a non-readable format that cannot be manipulated to obtain the original value. In one embodiment, the hash function may be the MD5 Message-Digest Algorithm invented by RSA® Laboratories. In one embodiment, the transformation function 332 may be enriched by one or more parameters. For example, the gender pertaining to the old_value is used when determining the new_value so that a new_value is determined that is compatible with the gender of the old_value. In this embodiment of the transformation function 332, the user may select the gender 511 and age 512 of the person in combination with the name of the person 513, when the transformation function 332 for the relevant integrity map is applied in order to compute the new_value. The parameter fields 333 gender 511 and age 512 may be stored together with the transformation function definition 332 in the relevant integrity map 301. In one embodiment, a transformation function 332 could include a randomized lookup of a country specific last name. Such a transformation function may read values from a sample set of country specific last names to obtain a new last name value that does not match the original last name value. Such a transformation function could receive a country name as input and return a randomized value that is sampled from a pool of names that are commonly used in that country. In an embodiment, a multiplicity of transformation functions may be associated with an integrity map and applied interchangeably with the integrity map based on the user's requirements.

Anonymization Process

Figure 6:
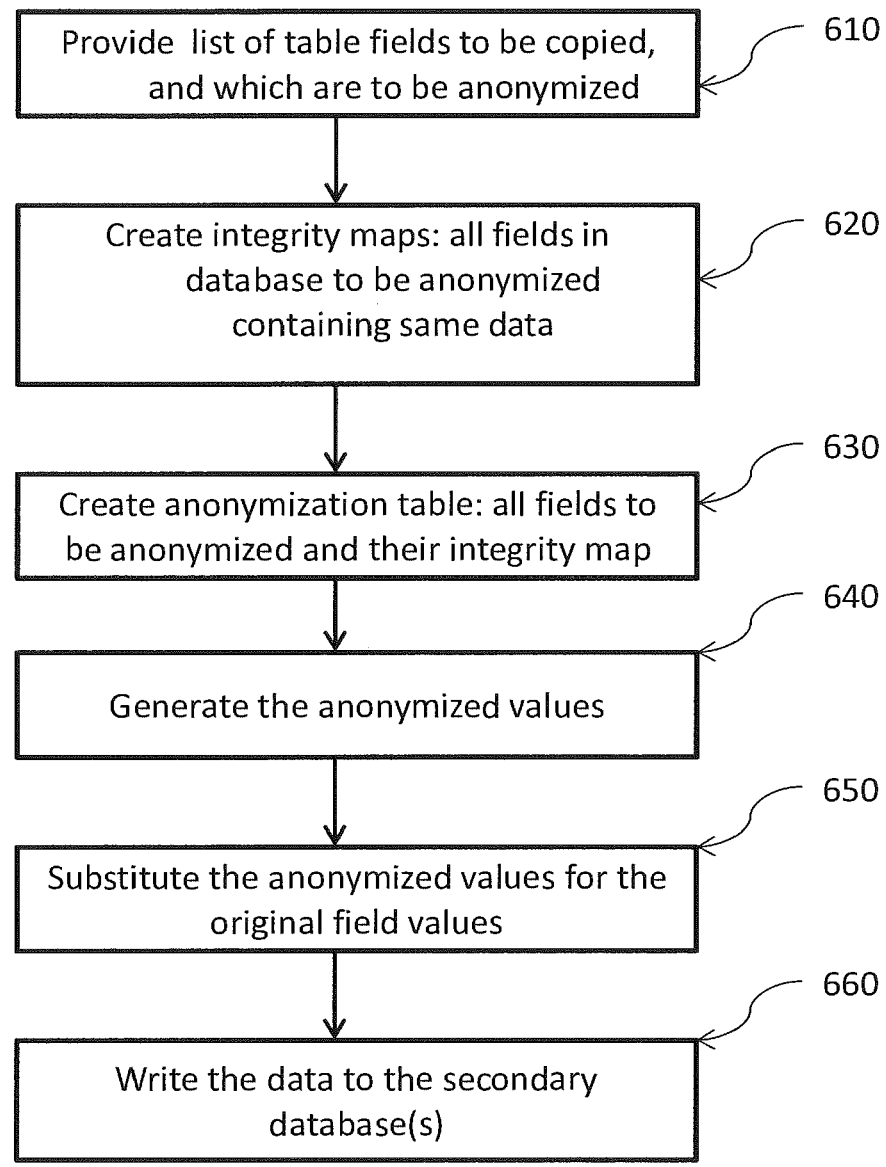
FIG. 6 illustrates the processing logic for the anonymization process in an exemplary embodiment.

FIG. 6 illustrates the processing logic for the anonymization process in an exemplary embodiment. There are two parts to the anonymization process. The first part is the construction stage in which the integrity maps and anonymization table are created and anonymization values are generated, as indicated by steps 610-640, and the second part is the copy set stage in which the copy set is read and processed, as indicated by steps 650-660. In an embodiment, the anonymized values may not be written to the secondary database, but substitute the original values in-place in a full copy of the primary system database.

Prior to a data base copy operation, a list of table fields to be copied and anonymized is created as indicated in logic block 610; the integrity maps 301 (302, 303, etc.) and anonymization table 400 are created and populated, as indicated in logic blocks 620 and 630; and anonymized values are generated for the relevant fields in logic block 640. The integrity maps 301 and anonymized values are created and stored once in the primary database and may be re-used during subsequent copy or in-place conversion operations. The anonymization table 400 may be created for each copy operation dynamically and need not be stored.

As indicated in logic blocks 630 and 640, anonymized values are determined for each of the fields listed in the anonymization table 400 using a transformation function. The anonymization comprises the following steps:

For each integrity map:
1. Retrieve the transformation function 332 and parameter fields 333 from the integrity map 301;

2. Retrieve the name 316 of the main table 311, as well as the name of the main field(s) 315 from the integrity map 301;
3. For each record in the main table 311:
   a. Read the main field 315 value(s) in the record—the designated old_value;
   b. Read the transformation function parameter values from the current record;
   c. Generate an anonymized new_value 517 for the old_value by applying the transformation function using the parameters (if applicable);
   d. Apply the one-way hash function to the old_value;
   e. Store the encrypted old_value 514 and new_value 517 in the value table 500.

In one embodiment, not all the integrity maps may be processed, but only those that contain fields to be copied in a planned copy procedure (i.e., only those fields needed immediately may be anonymized).

In one embodiment, instead of reading the transformation function parameter values from the current record being processed, the one or more values can be read from a field in a record from another table that is related to the current record, from the current table, by a foreign key relationship or series of foreign key relationships; or the one or more values can be calculated by another transformation function that executed before the current function; or the user may specify a constant value as input to the procedure.

When the copy process is started, the copy set is read and when the records 120 of a table 105 are processed, the table's structure is compared with the {table, field} pairs 410 in the anonymization table 400 to determine if any of the fields 110 of the records 120 processed need to be anonymized (block 640). For each such a field 412 encountered:

For each record 120:
1. Read the field value 414 (the designated old_value);
2. Apply the one-way hash function to the old_value to produce the encrypted old_value and look up a new_value in the value table 500 that corresponds to the encrypted old_value;
3. If a new_value is found, substitute the field value with the new_value;
4. Otherwise: repeat the anonymization procedure by applying the transformation function associated with the integrity map to produce a new_value. The one-way hash function is applied to determine an encrypted old_value. The {encrypted old_value, new value} pair is stored in the value table for future use.

In one embodiment, if the values of the parameters of the transformation function 332 cannot be determined from the current record or other records using foreign key relationships, the transformation function 332 may be evaluated with default values to produce a new_value.

The anonymized value 517 is substituted (block 650) for the original value for the record fields of the in-memory tables being processed and database copying continues (block 660) with the anonymized values.

In order to implement the disclosed embodiments, the user is required to be familiar with the dependencies between data fields in the database and would mark the necessary fields for anonymization. If the structure of a database is known, the specifications captured in the integrity maps could be re-used by subsequent users. It often holds that a set (i.e. a template) of known types of fields, that are sensitive and need to be anonymized, is available for a set of enterprise systems.

In one embodiment, the integrity maps could be used as part of a data mining mechanism to detect additional or new data fields, in a non-static database, with values that are semantically similar to values that are already captured in an integrity map. Stepping through each of the existing integrity maps, new candidate fields for inclusion in an integrity map may be identified by: selecting a sample of values for a candidate field in database tables containing untransformed values; applying the one-way hash function to the candidate values; and comparing their hash values to the hash values in the value table. If a candidate field has a high match rate with values stored in the value table, the field would be a likely candidate for inclusion in the associated integrity map. If the candidate field is included in the matched integrity map, it will be included in subsequent anonymization procedures.

This method allows the set of fields earmarked for anonymization to be grown either manually through user input or automatically with the specification of match tolerances and candidate fields. In one embodiment, this method may be combined with other data mining mechanisms for the automatic determination of the input set for anonymization procedures on any relational database for which the structure is unknown.

In another embodiment, an additional transformation may be applied to the anonymized value. In some instances, data fields containing essentially the same data and sharing an integrity map may use different formats to represent the same data. For example, one table may contain a field with the value "Peter Smith" and another table may contain this same information, but split into first name and last name fields containing the values "Peter" and "Smith," respectively. In this embodiment, a mapping function 318 may be defined and stored in the integrity map to define such a mapping. If the main table in the integrity map 315 contains the fields "first name" and "last name," a mapping function 318 may be stored for the field that contains the combined format. If the integrity map main field 315 contains the combined full name, the mapping function might generate a logical key composed of multiple components derived from the one main field 315. If information is lost during a mapping, such as when the one field contains "P Smith" only instead of the full name "Peter Smith", then in one embodiment, two records may be created in the value table—one for each variation of the name One record contains an encrypted old_value that is based on applying the one way hash function to the original value, and the other record contains an encrypted old_value based on the original value in the alternate format. The mapping function is applied to the new value that is associated with the encrypted old_value corresponding to the alternate version to ensure it is in the correct format for the field. The mapping function is applied to retrieve the main field value during value table creation and to provide the derived format during the copy step. In an embodiment where the main table in the integrity map 315 combines two fields, such as "first name" and "last name," to form a logical key, the integrity map will thus have two main fields.

If a significant percentage of a primary database 100 is anonymized, the value table 500 could result in a significant increase in the size of the primary database. This has cost and efficiency implications. To mitigate this problem, in one embodiment the value table 500 records may be compressed before they are stored in the value table.

In some cases, the original value of an anonymized field does not uniquely specify a record and its mapping to an anonymized value. For example, multiple persons may share the same name and would therefore be mapped to the same anonymized value, thereby forming a recognizable pattern of anonymized values. To avoid such patterns from being formed, auxiliary keys, retrieved from the auxiliary key fields 334 may be used to generate unique anonymized values in instances where it is known that such mappings are possible (as in the case of a person's name). In one embodiment, it may comprise a path which may include a key that is used to read another table containing a unique key. For example, if the problem arises in a person's tax record, there may be a key field such as personnel number which can be used to read the person's main personnel record in the personnel table where a unique key, such as a social security number, can be obtained. The relevant table and field names 334 may be stored in the integrity map 301 or provided as input, in an embodiment. The auxiliary keys from the auxiliary key fields 334 are used in conjunction with the old_value as input to the one way hash function to compute the encrypted old_value that is used to store or retrieve an anonymized value. In one embodiment, to identify when auxiliary keys should be applied, a flag field may be stored in the value table 500, and the flag could be set when it is detected that an old_value has already been stored in the value table 500 before. If this is detected, the subsequent old value is made unique by applying the one way hash function to the combination of the old_value and the values of the auxiliary keys in order to obtain a unique encrypted old_value, the unique encrypted old_value can then be stored with a unique new_value. When the anonymized value needs to be applied, the auxiliary keys are once again used to obtain a unique encrypted old_value for lookup when the first attempted lookup determines that the uniqueness flag in the value table has been set.

In one embodiment, data could be consistently anonymized across a landscape of systems as illustrated in FIG. 1A. The landscape may include multiple (separate and different) primary systems, and/or multiple target systems, such as a testing system and a development system. In such a scenario, anonymized values are retrieved by remote lookup in the primary system database where the value table resides, via remote function call to the primary system or through file transfer. The encrypted old_value is passed on during the remote lookup.

In a scenario wherein anonymized fields are being copied to an already existing partial copy of the primary system database, which is being updated incrementally, there may be a risk that a new anonymized record conflicts with one already existing on the target system. For example, personnel numbers may be anonymized and would need to match the numbering scheme of the target system where the data is to be inserted. Therefore, a final anonymized personnel number could not be determined until the data has been transmitted and reaches the target system(s), where the anonymized fields can be checked against the pre-existing ones in the target system. In case of a conflict, a new anonymized value needs to be determined.

In such a scenario, a unique anonymized value is computed in the regular way in the primary system but is regarded as an intermediate value. The intermediate value and transformation function along with its parameter values (if any) or lookup instructions may be passed on to the target system to calculate a final new_value once a target system is reached where this can be done.

In another embodiment, database systems may employ a concept of number sequences (e.g., savings banks may assign ranges of account numbers to their branches). In this embodiment, assigned anonymized numbers may be mapped to different number ranges defined on various target systems.

Figure 7:
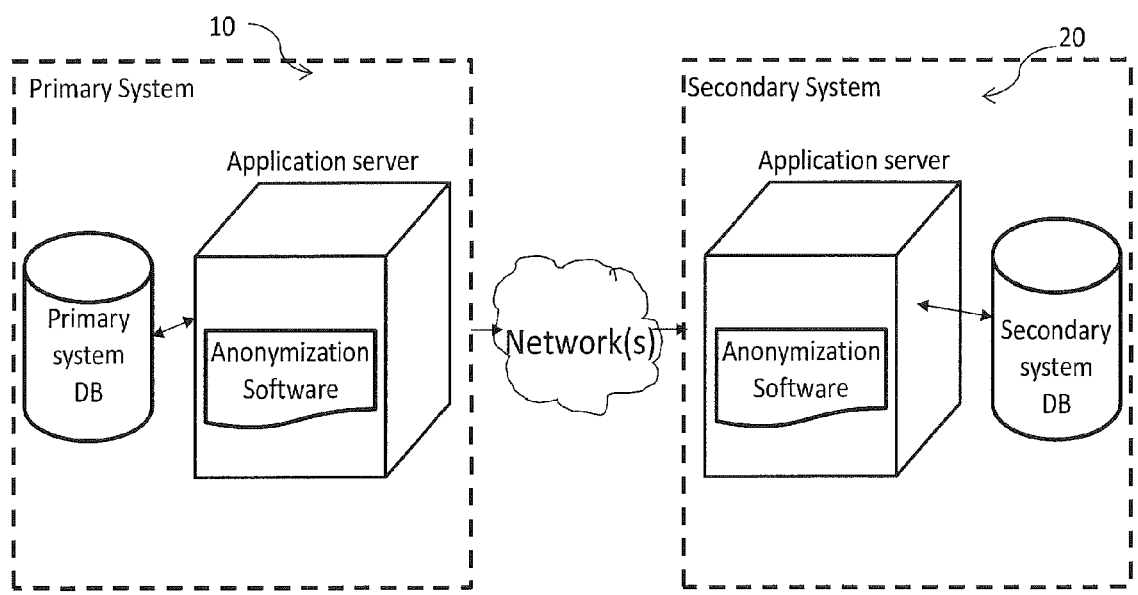
FIG. 7 illustrates the computer hardware and software components for implementing the anonymization process in an exemplary embodiment.

FIG. 7 shows an exemplary computer configuration of two computer systems 10, 20 capable of executing the software components described herein for copying or partial copying of a primary software system database via a connection, which could include a wideband communications network, such as the Internet, to a secondary system in the manner described herein.

As will be appreciated by one skilled in the art, the disclosed embodiments may be implemented as a system, method or computer program product. Accordingly, disclosed embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the disclosed embodiments may take the form of a computer program product embodied in one or more computer readable storage medium(s) having computer readable program code embodied thereon.

A computer readable storage medium may be any tangible medium that can contain, or store a program for use by or in connection with an instruction execution system, apparatus, or device. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out operations for the disclosed embodiments may be written in any combination of one or more programming languages, including an object oriented programming language such as Java, Smalltalk, C++ or the like and conventional procedural programming languages, such as the "C" programming language or similar programming languages.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagrams.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

The corresponding structures, materials, acts, and equivalents of any means plus function elements in the claims below are intended to include any structure, material, or acts for performing the function in combination with other claim elements as specifically claimed.

Those skilled in the art will appreciate that many modifications to the exemplary embodiments are possible without departing from the scope of the present invention. In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the invention is defined solely by the appended claims.

What is claimed:

1. A method for the anonymization of sensitive data from a plurality of selected business objects or tables stored in a plurality of data fields in at least one primary database included in an enterprise database system stored on a data storage device when copying portions of the at least one primary database to a secondary database in a computer memory, the method comprising:

specifying a plurality of data fields to be copied from the at least one primary database by a computer processor coupled to the primary database;

generating and populating at least one integrity map for each data field in the primary database requiring anonymization before copying to the secondary database, wherein the at least one integrity map is stored in a table associated with the primary database;

generating an anonymized value for each data field value in the primary database requiring anonymization;

substituting each data field value in the primary database requiring anonymization with the anonymized value; and copying the portions of the at least one primary database including anonymized values to the secondary database by the computer processor;

wherein generating an anonymized value for each data field in the primary database requiring anonymization comprises retrieving a transformation function and parameter fields from the at least one integrity map, retrieving the name of a main table and at least one main field name from the at least one integrity map, and generating an anonymized value for the main field value of each record in the main table in the integrity map using the transformation function and parameter fields; and wherein generating anonymized values for each record of the main field of the main table comprises reading the value of the main field in the record; generating an encrypted key by applying a one way hash function to the value of the main field, in combination with at least one auxiliary key, if required for uniqueness; and writing the encrypted key and the anonymized value to a value table.

2. The method of claim 1, wherein generating anonymized values for each record of the main field of the main table comprises:

reading the transformation function parameter values; and generating an anonymized value by applying the transformation function of the main field using the parameter values.

3. The method of claim 1, wherein the primary database is dynamic, the method further comprising: detecting new data field values in the primary database requiring anonymization by the computer processor by:

selecting a sample of values for a candidate field in database tables containing untransformed values by the computer processor;

applying a one-way hash function to the candidate values by the computer processor to encrypt them;

comparing the encrypted candidate values to the encrypted key values in a value table by the computer processor; and marking the candidate field for consideration by the user for inclusion in an associated integrity map by the computer processor, if the candidate field has a high match rate with values stored in the value table.

4. A computer program product comprising a computer readable medium coupled to a computer processor for the anonymization of sensitive data from a plurality of selected business objects or tables stored in a plurality of data fields in at least one primary database included in an enterprise database system stored on a data storage device when copying portions of the at least one primary database to a secondary database in a computer memory, the computer readable medium including a plurality of instructions which when executed on the computer processor causes the computer processor to:

specify a plurality of data fields to be copied from the at least one primary database;

generate and populate at least one integrity map for each data field in the primary database requiring anonymization before copying to the secondary database, wherein the at least one integrity map is stored in a table associated with the primary database;

generate an anonymized value for each data field value in the primary database requiring anonymization;

substitute each data field value in the primary database requiring anonymization with the anonymized value; and copy the portions of the at least one primary database including anonymized values to the secondary database by copying the tables containing anonymized fields and residing in the memory of the primary database system to the secondary system, determining that the calculated anonymized value does not duplicate an existing value in the secondary database in order to ensure that the anonymized values in the secondary database are unique, determining a new value if a duplicate value exists in the secondary database; and inserting the copied data into the secondary database tables.

5. A system for the anonymization of sensitive data from a plurality of selected business objects or tables stored in a plurality of data fields in at least one primary database included in an enterprise database system stored on a data storage device when copying portions of the at least one primary database to a secondary database, the system comprising:

a computer memory for storing the secondary database;

a computer processor coupled to the primary database for executing a plurality of components including:

a component for specifying a plurality of data fields to be copied from the at least one primary database;

a component for generating and populating at least one integrity map for each data field in the primary database requiring anonymization before copying to the secondary database, wherein the at least one integrity map is stored in a table associated with the primary database;

a component for generating an anonymized value for each data field value in the primary database requiring anonymization;

a component for substituting each data field value in the primary database requiring anonymization with the anonymized value; and a component for copying the portions of the at least one primary database including anonymized values to the secondary database;

wherein the component for generating an anonymized value for each data field in the primary database requiring anonymization comprises a module for retrieving a transformation function and parameter fields from the at least one integrity map, a module for retrieving the name of a main table and at least one main field name from the at least one integrity map, and a module for generating an anonymized value for the main field value of each record in the main table in the integrity map using the transformation function and parameter field; and wherein the component for generating anonymized values for each record of the key field of the main table comprises a module for reading the value of the main field in the record; a module for generating an encrypted key by applying a one way hash function to the value of the main field, in combination with at least one auxiliary key, if required for uniqueness; and a module for writing the encrypted key and the anonymized value to a value table.

6. The system of claim 5 wherein the component for generating anonymized values for each record of the key field of the main table further comprises:
   a module for reading the transformation function parameter values from the main table or from records in other tables that are related to the current record in the main table by foreign key relationships; and
   a module for generating an anonymized value by applying the transformation function to the value of the main field using the parameter values.

7. The system of claim 5, wherein the primary database component is dynamic and the system further comprises a component for detection of new data field values in the primary database requiring anonymization, the component for detection comprising:
   a module for selecting a sample of values for a candidate field in database tables containing untransformed values;
   a module for applying a one-way hash function to the candidate values to encrypt them;
   a module for comparing the encrypted candidate values to the encrypted keys in the value table; and
   a module for marking the candidate field for consideration by the user for inclusion in an associated integrity map, if the candidate field has a high match rate with values stored in the value table.

* * * * *